United States Patent
Bocos et al.

(10) Patent No.: US 12,140,238 B1
(45) Date of Patent: Nov. 12, 2024

(54) WATER CONSERVATION VALVE

(71) Applicants: Juan Carlos Bocos, Miami, FL (US); Juan Carlos Bocos Vilar, Miami, FL (US)

(72) Inventors: Juan Carlos Bocos, Miami, FL (US); Juan Carlos Bocos Vilar, Miami, FL (US)

( * ) Notice: Subject to any disclaimer, the term of this patent is extended or adjusted under 35 U.S.C. 154(b) by 0 days.

(21) Appl. No.: 18/096,320

(22) Filed: Jan. 12, 2023

Related U.S. Application Data

(60) Provisional application No. 63/392,075, filed on Jul. 25, 2022.

(51) Int. Cl.
*F16K 17/164* (2006.01)
*F16K 15/18* (2006.01)

(52) U.S. Cl.
CPC .......... *F16K 17/164* (2013.01); *F16K 15/182* (2021.08)

(58) Field of Classification Search
CPC ............................ F16K 17/164; F16K 15/025
See application file for complete search history.

(56) References Cited

U.S. PATENT DOCUMENTS

| | | |
|---|---|---|
| 917,449 A | 4/1909 | Jones |
| 948,084 A | 1/1910 | Neighbors |
| 1,349,253 A | 8/1920 | Astrom |
| 1,385,932 A | 7/1921 | Stayman |
| 1,844,265 A | 10/1927 | Noble |
| 1,811,166 A | 6/1931 | Yardley |
| 1,828,697 A | 10/1931 | Yardley |
| 1,860,004 A | 5/1932 | Yardley |
| 1,889,805 A | 12/1932 | Johnson |
| 2,071,969 A | 2/1937 | Diescher |
| 2,594,641 A | 4/1952 | Griffith et al. |
| 2,825,910 A | 3/1958 | Prudek |
| 3,036,594 A * | 5/1962 | Salisbury .............. F16K 15/063 137/533.19 |
| 3,053,500 A | 8/1962 | Atkinson |
| 3,299,704 A | 1/1967 | Wilson |

(Continued)

FOREIGN PATENT DOCUMENTS

| | | | |
|---|---|---|---|
| EP | 1154177 A2 * | 11/2001 | ........... F16K 15/025 |
| FR | 2567614 A1 * | 1/1986 | |
| KR | 200198110 Y1 * | 10/2000 | |

*Primary Examiner* — Marina A Tietjen
(74) *Attorney, Agent, or Firm* — Sanchelima & Associates, P.A.; Christian Sanchelima; Jesus Sanchelima

(57) ABSTRACT

A valve assembly structured to reduce the volume of water along a path of fluid flow of a water supply line, including a valve body having a stabilizing chamber, a receiving chamber, and a valve member disposed therein. The valve member is disposable between an open orientation and a closed orientation relative to fluid flow between the stabilizing and receiving chambers. A biasing structure is disposed to normally bias said valve member into the closed orientation and is configured to exert a predetermined biasing force on said valve member. A transfer passage is disposed in fluid communication with and between the stabilizing and receiving chambers and is configured to define and direct a decreased volume of fluid flow, at an increased water pressure, on said valve member, wherein the increased water pressure is greater than the predetermined biasing force and sufficient to dispose the valve member in the open orientation.

20 Claims, 2 Drawing Sheets

(56) References Cited

U.S. PATENT DOCUMENTS

| | | | |
|---|---|---|---|
| 3,565,100 | A | 2/1971 | Pfleger |
| 3,670,343 | A | 6/1972 | Gansloser |
| 2,960,998 | A | 11/1980 | Sinker et al. |
| 4,523,607 | A | 6/1985 | Daghe et al. |
| 4,691,727 | A | 9/1987 | Zorb et al. |
| 5,088,521 | A | 2/1992 | Johnson |
| 5,113,900 | A | 5/1992 | Gilbert |
| 5,161,572 | A | 11/1992 | Oberl et al. |
| 5,439,984 | A | 8/1995 | Kodama et al. |
| 5,482,080 | A | 1/1996 | Bergmann |
| 5,918,619 | A | 7/1999 | Woods et al. |
| 5,967,181 | A | 10/1999 | Momont et al. |
| 5,988,705 | A | 11/1999 | Norkey |
| 6,152,171 | A | 11/2000 | Messick et al. |
| 6,357,477 | B1 | 3/2002 | Walcott et al. |
| 6,397,884 | B1 | 6/2002 | Miyajima et al. |
| 6,632,764 | B2 | 3/2003 | Hirota et al. |
| 6,640,504 | B2 | 11/2003 | Pearlson et al. |
| 7,121,293 | B2 | 10/2006 | Walter et al. |
| 8,944,098 | B1 | 2/2015 | Bocos et al. |
| 9,644,356 | B1 * | 5/2017 | Gass ................ E03B 7/078 |
| 2004/0050427 | A1 | 3/2004 | Ryabtsev et al. |
| 2006/0185739 | A1 | 8/2006 | Cavagna |
| 2007/0277887 | A1 | 12/2007 | Imler et al. |
| 2008/0184792 | A1 | 8/2008 | Parris et al. |
| 2009/0289207 | A1 | 11/2009 | Barreda et al. |
| 2010/0257916 | A1 | 10/2010 | Barreda et al. |
| 2012/0118406 | A1 | 5/2012 | Edgeworth |

* cited by examiner

WATER CONSERVATION VALVE

CLAIM OF PRIORITY

The present application is based on, and a claim of priority is made under 35 U.S.C. Section 119(e) to a provisional patent application, namely, that having Ser. No. 63/392,075 and a filing date of Jul. 25, 2022, and which is incorporated herein by reference.

BACKGROUND OF THE INVENTION

Field of the Invention

The present invention is directed to a valve assembly structured to reduce air content in a path of water flow along a water supply line as well as decreasing the amount of water delivered to the water supply line, with an eventual and measurable reduction of water being delivered to a faucet, spigot or other outlet of the water supply line.

Description of the Related Art

Millions of people throughout the world have access to a water supply delivered to a domestic or commercial facility by water supply lines in the form of pipes, conduits, etc. The origin of the water supply, especially in an urban environment is typically from a public or regulated water utility which controls the supply, delivery, purification and/or processing of the water being delivered. In the alternative, many domestic facilities rely individually or collectively on wells or other underground water sources which may not be under the control of the public water utility company. In either situation, it is recognized that water must be delivered to a facility with sufficient pressure to assure an adequate quantity of water being supplied at a sufficient flow rate for use in a variety of different applications.

Water pressure may vary at different locations throughout a given geographical area and are based in large part upon the structure and/or efficiency of the corresponding distribution system. By way of example, water mains below ground may operate at a higher pressure in order to deliver the water to distribution stations. Moreover, pressure reducers or like structures are frequently disposed in the path of water flow at such distribution locations prior to being delivered to the domestic or commercial facility. Therefore, water may be delivered to a home or other conventional domestic facility having a typical and/or standard water pressure of generally about 60 psi.

In situations involving delivery of water along a conventional water supply line to a domestic or commercial facility, a metering of the water supply takes place generally at the point of delivery to the domestic or commercial facility. A conventional water metering facility may vary in both structure and operation but is typically provided to allow water utility companies or other agencies to charge for water based on the amount used. As a result, the metering of water delivered from a water utility company to any facility is widely considered to be an acceptable practice and a fair means of charging for the quantity of water utilized.

The monitoring procedure performed by the water meter being indicative of the quantity of water utilized is accomplished in numerous ways. However, many water delivery facilities are increasingly installing automatic meter reading systems to prevent fraud and lower the labor cost of manual meter reading. In addition, it is believed that such automatic meter reading systems improve customer service and satisfaction by assuring more accurate determination of the quantity of water being utilized.

As is commonly recognized by individuals associated with a public utility distribution facility, delivered water is metered to determine the quantity of water utilized, there is an occasional interruption of water supply. Such interruptions may be caused by repair, maintenance, malfunction, etc. and typically result in quantities of air entering into the water supply lines. As a result, segments of airflow or air pockets travel along the water flow within the water supply lines. In such situations, combined air and water are delivered to the various facilities connected to the supply lines after first passing through the meter assembly associated therewith. Accordingly, existing air is measured by metering facilities and charged to the corresponding facility as used water. This is due to the fact that most, if not all, metering facilities associated with either domestic or commercial facilities may not distinguish between the flow of air and the flow of water passing therethrough. Therefore, in situations where air enters the water supply line, the recipient is charged for water that is in fact not received due to the fact that the corresponding meter facility registers the flow of air passing therethrough as conventional water flow.

In light of the above noted problem, there is a need in the area of water distribution for an appropriate way of eliminating the passage of combined air and water to a metering or other downstream delivery facility associated with either a domestic or commercial entity. Such improved capabilities should efficiently function to prevent or significantly reduce the passage of air flow through metering facilities, while not interfering with the regular and intended supply of water delivered by the conventional water supply line. Such an improved structure or facility should include sufficient structural integrity and operative performance to assure a long operative life, while not requiring excessive maintenance, repair or replacement. In addition, such a proposed and preferred facility or assembly should be sufficiently low in initial cost to be economically viable for widespread use in conventional water supply lines for homes, businesses, etc. which are connected to a water delivery system.

SUMMARY OF THE INVENTION

The present invention is directed to a valve assembly structured to eliminate or significantly reduce the presence of air traveling along a path of fluid flow and mixed with water within a conventional water supply line.

As is well recognized, there are occasional breakdowns, repairs, maintenance procedures, malfunctions, etc., of public water utility facilities and/or other water distribution and supply systems which results in the interruption of water delivery. Such interruptions, while not common, frequently result in air entering the path of fluid flow within the water supply lines. Such interruptive air flow may be in the form of air pockets or air segments or measurable quantities of air otherwise mixed with water passing along the path of fluid flow within a delivery of supply line. As such, the included air is at least partially distinguishable from the conventional water flow passing through the water supply line(s). As a result, the homes, businesses and like facilities connected to the water supply lines are charged for water that was never delivered.

It is also recognized that in a conventional water supply facility controlled and regulated by a public water utility, water is delivered to most domestic and commercial entities at a water pressure of generally about 60 psi. In contrast, the encroachment of air into the water supply line is typically delivered to the connected home or other intended facility at a significantly lower pressure of generally about 0.3 kg f/cm2. Therefore, the pressure of fluid flow comprising both water and air is significantly lower than the pressure a fluid flow consisting of water, which is absent the inclusion of air therein.

The present invention is therefore directed to the aforementioned valve assembly, which is structured to remove or significantly reduce the air in a path of fluid or water flow along a water supply line, prior to it reaching an intended downstream delivery point.

The valve assembly of the present invention comprises a valve body including an at least partially hollow interior including an interior stabilizing chamber and an interior receiving chamber. A valve member is movably and/or reciprocally movable within the valve body between an open orientation and a closed orientation relative to a fluid flow between the stabilizing chamber and the receiving chamber. Further, a biasing structure is disposed to exert a predetermined biasing force on the valve member. Such biasing force exerted on the valve member to normally bias it into the closed orientation, thereby stopping fluid flow between the stabilizing and receiving chambers. In more specific terms, the valve body further includes a valve body inlet disposed in direct fluid communication with the water supply line and path of fluid flow contained therein. The valve body also includes a valve body outlet disposed downstream of the valve body inlet, stabilizing chamber and receiving chamber and in direct fluid communication with a downstream portion of the water supply line and/or path of fluid flow. Further, the body outlet delivers fluid flow to the downstream portion of the water supply line, which directs water to the one or more delivery points. In structural cooperation therewith the stabilizing chamber is in direct fluid communication with the valve body inlet, wherein the receiving chamber is downstream and in fluid communication with the stabilizing chamber upon disposition of the valve member from the closed orientation into the open orientation.

In addition, a transfer passage is disposed within the interior of the valve body in fluid communication with and between the stabilizing chamber and the receiving chamber. As such, the transfer passage is configured to define and direct an increased water pressure of the fluid flow on exposed portions of the valve member, while the valve member is in the closed orientation. The increased water pressure developed in the fluid flow is greater than the aforementioned predetermined biasing force and is thereby sufficient to dispose the valve member in the open orientation. When in the open orientation the fluid flow passes through the transfer passage from the stabilizing chamber into the receiving chamber and outwardly from the valve body through an outlet is accomplished.

By way of clarification and with reference to a nonlimiting example, the pressure of water passing along through the interior of the valve body, successively from the stabilizing chamber to the receiving chamber, via the transfer passage is assumed to be a standard or typical 60 psi. However, it should be recognized that when quantities of air, air pockets, air segments etc. are mixed with the water within the fluid flow, the fluid flow will be at a pressure lower than the standard or typical 60 psi. Moreover, as indicated by a nonlimiting example, the predetermined biasing force normally exerted on the valve member by the biasing structure will be generally about 60 psi. However, due to the aforementioned mixture of air with the water flow, the pressure of the combined air and water fluid flow exerted on the valve member will be insufficient to move the valve member from the normally biased closed orientation to the open orientation.

As indicated, the transfer passage is configured to define and direct an increased water pressure of the fluid flow on the valve member when in the closed orientation. Such increased water pressure is a result of a compression, displacement and/or removal, of air within the fluid flow entering the valve body into the stabilizing chamber. Accordingly, in at least one embodiment the configuration of the transfer passage comprises a flow port disposed between and in fluid communication with both the stabilizing chamber and the receiving chamber. The flow port is preferably structured to have a significantly smaller diameter through which water flows between the stabilizing and receiving chambers, than a corresponding diameter of the stabilizing chamber.

In addition, the configuration of the transfer passage further comprises an angularly convergent configuration extending from an interior of the stabilizing chamber to the flow port. While such an angularly convergent configuration may vary in dimension, at least one embodiment includes it comprising an angular configuration of generally about 120° from an interior surface of the stabilizing chamber to the entrance of the flow port. Further, the diameter of a portion of the divergent angular configuration, disposed contiguous to the flow port, is substantially equal to the reduced diameter of the flow port.

As should be apparent, upon fluid flow entering the stabilizing chamber, the aforementioned configuration of the transfer passage will result in a compression force or increased pressure being exerted on the combined water and air flow. Such a compression force will result in a compression or displacement of air within the fluid flow. Therefore, the removal or significant reduction of air within the water flow will result a denser quantity of water in the fluid flow as it passes into and through the transfer passage. In turn, displacement of the air within the fluid flow and the increased density thereof will result in an increased water pressure to the of standard 60 psi. Such increased pressure of the fluid flow will be exerted on the valve member when it is in the closed orientation. Such increased water pressure of fluid flow will be sufficient to overcome the predetermined biasing force and displace the valve member from the closed orientation into the open orientation. Fluid flow, comprised of the denser water flow, due to the removal or displacement of air therefrom, will pass through the flow port from the stabilizing chamber into the receiving chamber.

Additional structural features of one or more embodiments of the valve assembly of the present invention include a valve seat disposed within the valve body, downstream and in adjacent and/or contiguous relation to the flow port. The closed orientation comprises the valve member and/or one end or portion thereof being seated in sealing engagement with the valve seat. Concurrently, when the valve member is in sealing engagement with the valve seat it will be in sealing relation to the flow port. Further, such closed orientation of the valve member will result in a sealing relation of the flow port and a direct exposure of the one end or other portion of the valve member to the increased water pressure of fluid flow attempting to pass through the flow port, subsequent to the air being removed therefrom, such as in the manner set forth above.

In order to further facilitate fluid flow through the valve body from the stabilizing chamber to the receiving chamber via the reduced diameter flow port, the valve seat and/or the interior surfaces of the receiving chamber contiguous to the flow port and/or valve seat includes an angularly divergent configuration extending from the flow port to an interior of the receiving chamber. Such divergent angular configuration will cause an expansion of the water or fluid flow through the flow port into the receiving chamber and a regular and/or intended quantity of water passing through the receiving chamber and outwardly from the interior of the valve body through the valve body outlet.

Yet additional structural and operative features of one or more embodiments of the valve assembly of the present invention include the biasing structure preferably, but not necessarily, being in the form of a spring member such as, but not limited to, a coil spring mounted on and/or connected to the valve member so as to exert the aforementioned predetermined biasing force thereon which normally maintains it in the closed orientation. In cooperation therewith, a retainer is fixedly connected and/or disposed within the receiving chamber in somewhat supporting and connected relation to the biasing structure. Accordingly, the biasing structure may be disposed in interconnect relation between the fixedly disposed retainer and the valve member.

As also described in greater detail hereinafter, the receiving chamber may have somewhat of an enlarged configuration and include a delivery chamber or segment disposed in direct fluid communication with an interior of the receiving chamber. Further, the valve body outlet is disposed in direct fluid communication with the receiving chamber via the delivery chamber segment. Thereafter, the fluid flow composed of a denser water quantity, being absent air or containing a reduced air content, passes from the receiving chamber to and through the delivery segment or chamber and outwardly from the valve body through the valve outlet. As indicated, the valve body outlet is disposed in direct fluid communication with the water supply line and the path of fluid flow passing there along.

Accordingly, the biasing structure will be specifically structured to exert a predetermined biasing force on the valve member, which is insufficient to overcome the conventional water pressure of, by way of example only, 60 psi. Such a conventional or more specifically "increased water pressure" will be exerted on the valve member, once the air has been compressed, displaced or otherwise removed from the fluid flow as it reaches and exerts pressure on the valve member, when in the closed orientation.

However, the predetermined biasing force exerted on the valve member will be sufficient to maintain the valve member in the closed orientation when it is subjected to a lesser pressure from the combined air pressure and water pressure existing within the fluid flow entering the stabilizing chamber. As indicated, such combined air pressure and water pressure will be less than the 60 psi water pressure (described by way of example only) of the increased water pressure of the denser water passing through and along the transfer passage and flow port, once the air has been compressed, displaced or otherwise removed.

It should also be recognized that as water passes through the transfer passage and flow port it will be passing through the valve at an increased rate of travel as well as an increased water pressure, as set forth herein. However, the reduced configuration of the flow port and transfer passage will also result in a lesser volume of water passing therethrough into the delivery chamber or segment. Operative experience with the valve assembly indicates that the volume of water passing through the flow port and transfer passage will be reduced by generally about 40%. In turn generally about 40% of water will be delivered into the receiving chamber and delivery chamber/segment. Accordingly, the amount of water leaving the outlet of the valve assembly and entering the supply line, conduit or pipe will be reduced by generally about 40% from that quantity of water entering the valve assembly. It is further recognized that as the water travels from the valve assembly to the intended water outlet (spigot, faucet, etc.) the volume thereof will increase to a somewhat lesser amount than the referred to 40% reduction, resulting from the passage of the water through the valve assembly. More specifically, experience with the operative features of the valve assembly indicate that the expansion of the water as it passes through the supply line, conduit, pipe etc. to the faucet or like outlet, because of the increased speed, will not recover the full 40% of volume. As a result, a reduced amount of water generally the range of 3% to 10% flows to and reaches the outlet (spigot, faucet, etc.), for delivery and use.

A reasonable analysis and by way of a non-limiting example, comprises the operative features of known and/or conventional shower heads which are structured to reduce the volume of water issuing therefrom during a shower. Less water per minute is flowing therethrough. Therefore, during a 30-minute shower less water will be used since there is less gallons per minute passing through the shower head. However, because the pressure of water stays the same or may even increase, the user does not feel the drop off in water volume. Similarly, in the present invention, the process of compression of fluid flow through the valve resulting in the elimination or reduction of air therein, also reduces the rate of water passing through the valve, as set forth in greater detail herein.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is directed to a valve assembly, generally indicated as 10, structured to remove or significantly reduce the air in a path of fluid or water flow along a water supply line, prior to it reaching and intended downstream delivery point.

Figure 1:
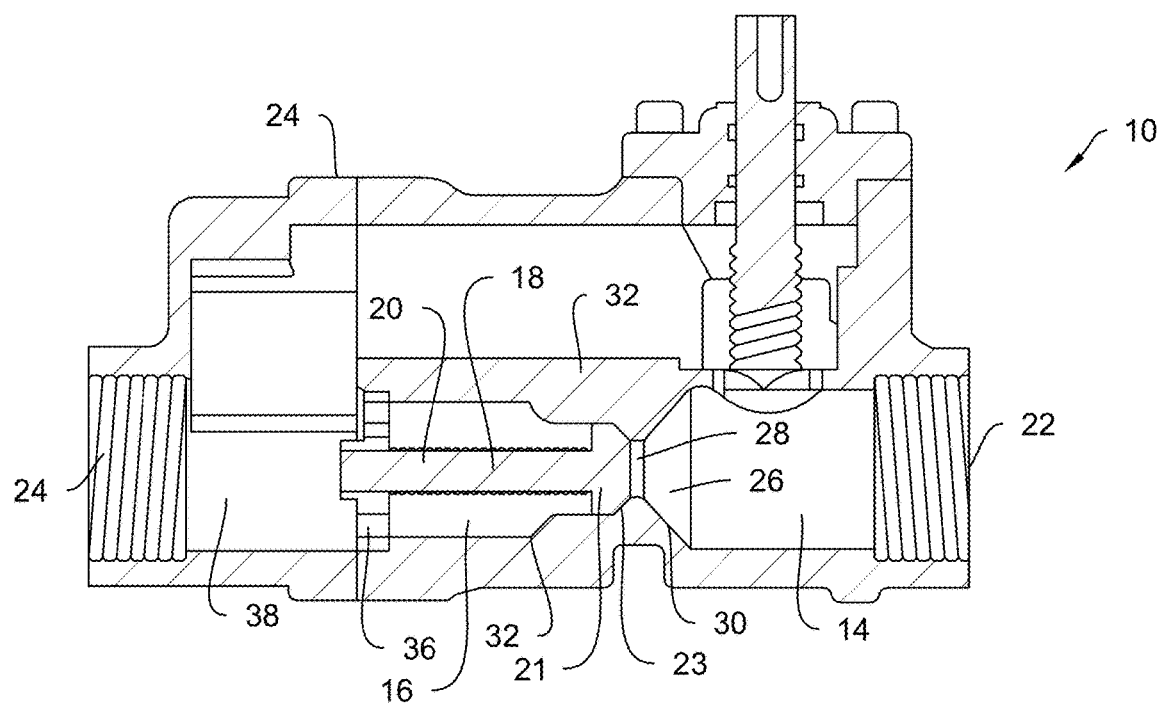
FIG. 1 is an interior sectional view of the valve assembly of the present invention.
Figure 2:
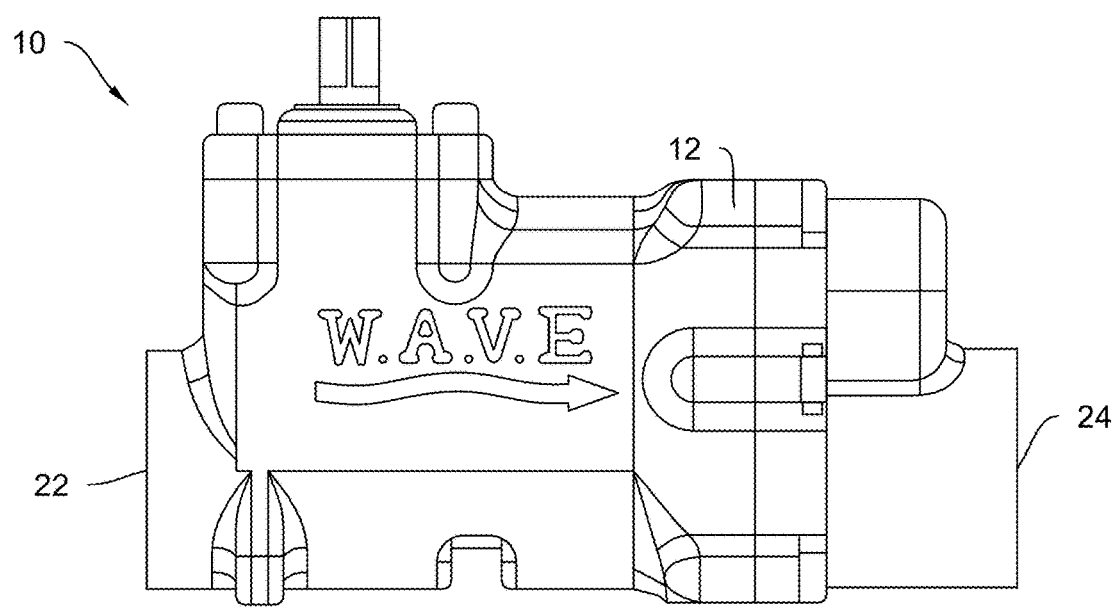
FIG. 2 is a front side view of the embodiment of FIG. 1.
Figure 3:
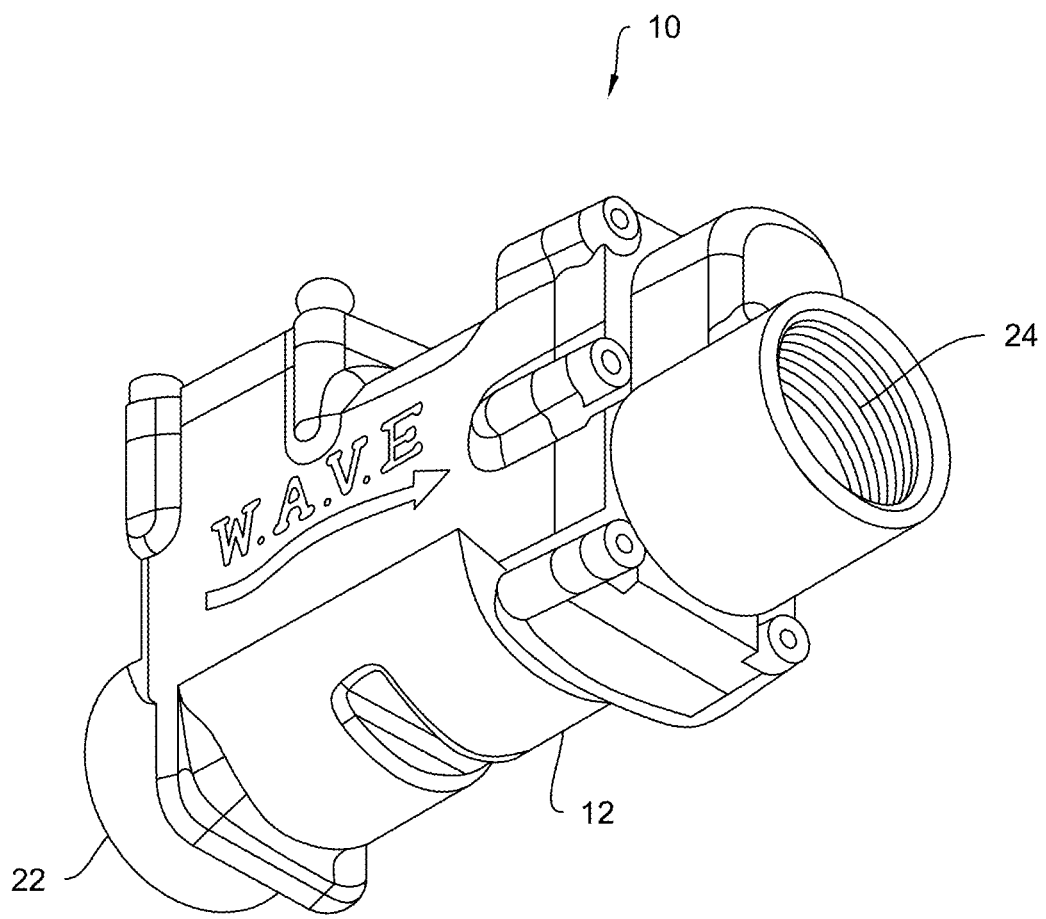
FIG. 3 is a front perspective view of the embodiment of FIGS. 1 and 2.

The valve assembly 10 comprises a valve body 12 including an at least partially hollow interior including an interior stabilizing chamber 14 and an interior receiving chamber 16. A valve member 18 is movably and/or reciprocally movable within the valve body 12 between an open orientation and a closed orientation, the latter represented in FIG. 1, relative to fluid flow passing between the stabilizing chamber 14 and the receiving chamber 16. Further, a biasing structure 20 is disposed to exert a predetermined biasing force on the valve member 18. Such biasing force is exerted on the valve member 18 to normally bias it into the closed orientation, thereby stopping fluid flow between the stabilizing chamber 14 and receiving chamber 16. Also, the valve body 12 includes a valve body inlet 22 disposed downstream of and in direct fluid communication with the path of water flow from a point of origin along a water supply line. The valve body 12 also includes a valve body outlet 24 disposed downstream of the valve body inlet 22, stabilizing chamber 14 and receiving chamber 16 and in direct fluid communication with a downstream portion of the water supply line and/or path of fluid flow. Further, the valve body outlet 24 delivers fluid flow to the downstream portion of the water supply line, which directs water to the one or more delivery points. In structural cooperation therewith, the stabilizing chamber 14 is in direct fluid communication with the valve body inlet 22, wherein the receiving chamber 16 is downstream and in fluid communication with the stabilizing chamber 14 upon disposition of the valve member 18 from the closed orientation of FIG. 1 into the open orientation.

In addition, a transfer passage, generally indicated is 26 is disposed within the interior of the valve body 12 in fluid communication with and between the stabilizing chamber 14 and the receiving chamber 16. As such, the transfer passage 26 is configured to define and direct an increased water pressure of the fluid flow on an exposed portion or the valve head 21 of the valve member 18, while the valve member 18 is in the closed orientation. The increased water pressure developed in the fluid flow is greater than the aforementioned predetermined biasing force and is thereby sufficient to dispose the valve member 18 in the open orientation. When in the open orientation the fluid flow passes, through the transfer passage 26 from the stabilizing chamber 14 into the receiving chamber 16 and outwardly from the valve body through the outlet 24 is accomplished.

By way of clarification and with reference to a nonlimiting example, the pressure of water passing along through the interior of the valve body 12, successively into the housing inlet 22, through the stabilizing chamber 14, to the receiving chamber 16, via the transfer passage 26 is assumed to be a standard or typical 60 psi. However, it should be recognized that when quantities of air, air pockets, air segments etc. are mixed with the water within the fluid flow, the pressure thereof will be lower than the standard or typical 60 psi. Moreover, as indicated by a nonlimiting example, the predetermined biasing force normally exerted on the valve member 18 by the biasing structure 20 will be generally about 60 psi. Accordingly, if the water pressure of the fluid flow was at the standard 60 psi the force exerted on the valve member 18 would be sufficient to overcome the predetermined biasing force. However, due to the aforementioned mixture of air within the water of the fluid flow, the pressure of the combined air and water fluid flow exerted on the valve member 18 will be less than the standard 60 psi and therefore be insufficient to move the valve member 18 from the normally biased closed orientation to the open orientation.

Therefore, the transfer passage 26 is configured and dimensioned to define and direct an increased water pressure of the fluid flow on the valve member 18 when in the closed orientation. Such increased water pressure will result in compression, displacement and/or removal, of air within the combined air and water fluid flow entering the valve body 12 through the inlet 22, into the stabilizing chamber 14. Accordingly, in at least one embodiment the configuration of the transfer passage 26 comprises a flow port 28 disposed between and in fluid communication with both the stabilizing chamber 14 and the receiving chamber 16. The flow port 28 is preferably structured to have a significantly smaller diameter through which water flows between the stabilizing and receiving chambers 14 and 16, than a corresponding diameter of the stabilizing chamber, as schematically indicated as 14'.

In addition, the configuration of the transfer passage 26 further comprises an angularly convergent configuration 30 extending from an interior of the stabilizing chamber 14 to the flow port 28. While such an angularly convergent configuration may vary in dimension, at least one embodiment includes it comprising an angular configuration of generally about 120° from an interior surface of the stabilizing chamber 14 to the entrance of the flow port 28. Further, the diameter of a portion of the divergent angular configuration, disposed contiguous to the flow port, is substantially equal to the reduced diameter of the flow port 28.

Moreover, upon fluid flow entering the stabilizing chamber 14 and entering the transfer passage 26, the aforementioned angularly convergent configuration of the transfer passage 26 as well as the reduced diameter of the flow port 28, will result in a compression force or increased pressure being exerted on the combined water and air flow. Such a compression force will result in a compression or displacement of air within the fluid flow. Therefore, the removal or significant reduction of air within the fluid flow will result a denser quantity of water in the fluid flow as it passes into and through the transfer passage 26, including the flow port 28. In turn, displacement/compression of the air within the fluid flow and the increased density thereof will result in an increased water pressure up to the of standard 60 psi. Such increased pressure of the fluid flow will be exerted on the valve head 21 exposed through the flow port 28, when the valve member 18 is in the closed orientation. Such increased water pressure of fluid flow will be sufficient to overcome the predetermined biasing force and displace the valve member 18 from the closed orientation into the open orientation. Fluid flow, comprised of the denser water flow, due to the removal or displacement of air therefrom, will pass through the flow port 28 from the stabilizing chamber 14 into the receiving chamber 16.

It should also be recognized that as water passes through the transfer passage 26 and flow port 28 it will be passing through the valve at an increased rate of travel as well as an increased water pressure, as set forth above. However, the reduced configuration of the flow port 28 and transfer passage 26 will also result in a lesser volume of water passing therethrough into the delivery chamber or segment 38. Operative experience with the valve assembly 10 indicates that the volume of water passing through the flow port and transfer passage will be reduced by generally about 40%. In turn generally about 40% of water will be delivered into the receiving chamber 16 and delivery chamber/segment 38. Accordingly, the amount of water leaving the outlet 24 of the valve and entering the delivery conduit or pipe will be reduced by generally about 40% from that quantity of water entering the valve assembly 10. It is further recognized that as the water travels from the valve assembly 10 to the intended water outlet (spigot, faucet, etc.) the volume thereof will increase to a somewhat lesser amount than the referred to 40% reduction, resulting from the passage of the water through the valve assembly 10. More specifically, experience with the operative features of the valve 10 indicate that the expansion of the water as it passes through the conduit to the faucet or like outlet, because of the increased speed, will not recover the full 40% of volume. As a result, a reduced amount of water generally the range of 3% to 10% flows to and reaches the outlet (spigot, faucet, etc.), for delivery and use.

Additional structural features of one or more embodiments of the valve assembly 10 of the present invention include a valve seat 23 disposed within the valve body 12, downstream and in adjacent and/or contiguous relation to the flow port 28. The aforementioned closed orientation comprises the valve head 21 being seated in sealing engagement with the valve seat 23. Concurrently, when the valve member 18 is in sealing engagement with the valve seat 23 it will be in sealing relation to the flow port 28. Further, such closed orientation of the valve member 18 will result in a sealing relation of the flow port 28 and a direct exposure of the valve head 21 to the increased water pressure of fluid flow attempting to pass through the transfer passage 26 and flow port 28, subsequent to the air being removed therefrom.

In order to further facilitate fluid flow through the valve body 12 from the stabilizing chamber 14 to the receiving chamber 16 via the reduced diameter flow port 28, the valve seat 23 and/or the interior surfaces of the receiving chamber 16 contiguous to the flow port 28 and/or valve seat 23 includes an angularly divergent configuration, extending from the flow port 28 to an interior surface of the receiving chamber 16. In cooperation therewith downstream interior surface portions of the receiving chamber 16 also include the aforementioned divergent angular configuration, indicated as 32. Such divergent angular configuration(s) will cause an expansion of the water or fluid flow once passing through the flow port 28 into the receiving chamber 16. In turn, a regular and/or intended quantity of water will pass through the receiving chamber 16 and outwardly from the interior of the valve body 12 through the valve body outlet 24.

Yet additional structural and operative features of one or more embodiments of the valve assembly 10 include the biasing structure 20 preferably, but not necessarily, being in the form of a spring member such as, but not limited to, a coil spring mounted on and extending along and/or otherwise connected to the valve member 18 in a manner which exerts the aforementioned predetermined biasing force thereon, thereby normally maintaining the valve member 18 in the closed orientation.

In cooperation therewith, a retainer 36 is fixedly connected and/or disposed within the receiving chamber 16 in somewhat supporting and connected relation to the biasing structure 20. Accordingly, the biasing structure 20 may be disposed in interconnected relation between the fixedly disposed retainer 36 and the valve member 18.

As also described in greater detail hereinafter, the receiving chamber 16 may have somewhat of an enlarged configuration and include a delivery chamber or segment 38 disposed in direct fluid communication with an interior of the receiving chamber 16. Further, the valve body outlet 24 is disposed in direct fluid communication with the receiving chamber 16 via the delivery chamber segment 38. The fluid flow composed of the denser water quantity, being absent air or containing a reduced air content, passes from the receiving chamber 16 to and through the delivery segment or chamber 38 and outwardly from the valve body 12 through the valve body outlet 24. As indicated, the valve body outlet 24 is disposed in direct fluid delivering communication with the water supply line and the path of fluid flow passing there along.

Accordingly, the biasing structure 20 will be specifically structured to exert a predetermined biasing force on the valve member 18, which is insufficient to overcome a conventional water pressure of, by way of example only, 60 psi. However, such a conventional or more specifically "increased water pressure" will be exerted on the exposed valve head 21 of the valve member 18, once the water and air fluid flow has been compressed and the air or at least a portion thereof has been displaced or otherwise removed from the fluid flow as it reaches and exerts pressure on the exposed valve head 21 of the valve member 18, through the flow port 28, when the valve head 21 is in sealed engagement with the valve seat 23, defining the valve member 18 being in the closed orientation.

However, the predetermined biasing force exerted on the valve member 18 will be sufficient to maintain the valve member 18 in the closed orientation when it is subjected to a lesser pressure from the combined air pressure and water pressure existing within the fluid flow entering the stabilizing chamber 14. As indicated, such combined air pressure and water pressure will be less than the 60 psi water pressure (described by way of example only) of the increased water pressure of the denser water passing through and along the transfer passage 26 and flow port 28, once the air has been compressed, displaced or otherwise removed.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A valve assembly structured to reduce air content in a path of fluid flow along a water supply line, said valve assembly comprising:
   a) a valve body disposed along the path of fluid flow,
   b) said valve body including a stabilizing chamber and a receiving chamber, wherein said valve body is integrated to a spigot, said spigot has a spindle adjacent to the stabilizing chamber;
   c) a valve member disposable between an open orientation and a closed orientation relative to a fluid flow between said stabilizing chamber and said receiving chamber,
   d) a biasing structure disposed to normally bias said valve member into said closed orientation between said stabilizing chamber and said receiving chamber,
   e) said biasing structure configured to exert a predetermined biasing force on said valve member,
   f) a transfer passage disposed in fluid communication with and between said stabilizing chamber and said receiving chamber,
   g) said transfer passage configured to define and direct an increased water pressure of said fluid flow on said valve member,
   h) said increased water pressure greater than said predetermined biasing force and sufficient to dispose said valve member in said open orientation;
   i) a valve seat disposed downstream and in contiguous relation to a flow port, said closed orientation comprising said valve member disposed in sealing engagement with said valve seat and sealing relation to said flow port wherein said valve seat has a first portion and a second portion, said first portion is located next to the flow port, said first portion has an inclination extending radially towards said second portion, said second portion is a horizontal straight portion parallel to the valve member said second portion has a diameter equal to a head diameter, said valve seat has an angularly divergent configuration extending from said flow port to an interior of said receiving chamber, wherein a diameter of said receiving chamber is larger than the diameter of the second portion.

2. The valve assembly as recited in claim 1 wherein said flow port having a predetermined configuration at least relative to said stabilizing chamber.

3. The valve assembly as recited in claim 2 wherein said predetermined configuration of said flow port includes a smaller diameter than a corresponding diameter of said stabilizing chamber.

4. The valve assembly as recited in claim 3 wherein said flow port is disposed in interconnecting, fluid communicating relation between said stabilizing chamber and said receiving chamber.

5. The valve assembly as recited in claim 2 wherein said configuration of said transfer passage further comprises an angularly convergent configuration extending from said stabilizing chamber to said flow port.

6. The valve assembly as recited in claim 5 wherein said angularly convergent configuration comprises generally about 120° from an interior surface of said stabilizing chamber.

7. The valve assembly as recited in claim 1 further comprising a retainer fixedly disposed within said valve body in movably retaining relation to said valve member, concurrent to said valve member movable relative to said retainer between said open orientation and said closed orientation.

8. The valve assembly as recited in claim 7 wherein said biasing structure is disposed and interconnected relation between said retainer and said valve member.

9. The valve assembly as recited in claim 1 wherein said valve body further comprises a delivery chamber disposed downstream of and in fluid communication with said receiving chamber and in fluid delivering relation to a valve body outlet.

10. The valve assembly as recited in claim 1, wherein the second portion of the valve seat is oriented opposite to the stabilizing chamber.

11. A valve assembly structured to reduce air content in a path of fluid flow along a water supply line, said valve assembly comprising:
a) a valve body disposed within the path of fluid flow and including a stabilizing chamber, a receiving chamber and a valve member,
b) a transfer passage including a flow port disposed in fluid communication with said stabilizing chamber and said receiving chamber,
c) said valve member reciprocally movable between a closed orientation and an open orientation relative to fluid flow between said stabilizing chamber and said receiving chamber; said valve member normally biased into said closed orientation under a predetermined biasing force,
d) said closed orientation and said open orientation respectively comprising said valve member disposed in closing relation to said flow port, e) said transfer passage configured to at least partially define and direct an increased water pressure of said fluid flow on said valve member, at least when in said closed orientation,
f) said increased water pressure being greater than said predetermined biasing force and sufficient to dispose said valve member in said open orientation;
g) a valve seat disposed downstream and in contiguous relation to said flow port said closed orientation comprising said valve member disposed in sealing engagement with said valve seat and sealing relation to said flow port, wherein said valve seat has a first portion and a second portion, said first portion is located next to the flow port said first portion has an inclination extending radially towards said second portion, said second portion is a horizontal straight portion parallel to the valve member and opposite to the stabilizing chamber, wherein said valve head is configured to travel an entire length of said second portion to allow the fluid to flow the fluid therethrough, said second portion has a diameter equal to a valve head diameter, said valve seat has an angularly divergent configuration extending from said flow port to an interior of said receiving chamber wherein a diameter of said receiving chamber is larger than the diameter of the second portion.

12. The valve assembly as recited in claim 11 wherein said configuration of said transfer passage comprises a diameter of said flow port being less than a corresponding diameter of said stabilizing chamber.

13. The valve assembly as recited in claim 12 wherein said configuration of said transfer passage further comprises an angularly convergent configuration extending from said stabilizing chamber to said port.

14. The valve assembly as recited in claim 13 wherein said angularly convergent configuration is disposed at generally about 120° from an interior surface of said stabilizing chamber.

15. The valve assembly as recited in claim 11 further comprising a valve seat having an angularly divergent configuration extending from said flow port to an interior of said receiving chamber.

16. The valve assembly as recited in claim 15 wherein said angularly divergent configuration of said valve seat is disposed at generally about 120° from an interior surface of said receiving chamber.

17. The valve assembly as recited in claim 15 wherein said valve seat is disposed downstream and in contiguous relation to said flow port, said valve member disposed in sealing engagement with said valve seat and sealing relation to said flow port, concurrent to said closed orientation.

18. The valve assembly as recited in claim 11 further comprising a retainer fixed within said valve body in movably retaining engagement with said valve member, concurrent to said reciprocal movement of said valve member between said closed orientation and said open orientation.

19. The valve assembly as recited in claim 11 further comprising a biasing structure disposed to exert said predetermined biasing force on said valve member and in interconnected relation with said retainer and said valve member.

20. A valve assembly structured to reduce air content in a path of fluid flow along a water supply line, said valve assembly consisting of:
a) a valve body disposed along the path of fluid flow,
b) said valve body including a stabilizing chamber and a receiving chamber, c) a valve member disposable between an open orientation and a closed orientation relative to a fluid flow between said stabilizing chamber and said receiving chamber,
d) a biasing structure disposed to normally bias said valve member into said closed orientation between said stabilizing chamber and said receiving chamber,
e) said biasing structure configured to exert a predetermined biasing force on said valve member, wherein said biasing force corresponds to a pressure of psi,
f) a transfer passage disposed in fluid communication with and between said stabilizing chamber and said receiving chamber,
g) said transfer passage configured to define and direct an increased water pressure of said fluid flow on said valve member,
h) said increased water pressure greater than said predetermined biasing force and sufficient to dispose said valve member in said open orientation;
i) a valve seat disposed downstream and in contiguous relation to a flow port, said closed orientation comprising said valve member disposed in sealing engagement with said valve seat and sealing relation to said flow port, wherein said valve seat has a first portion and a second portion, said first portion is located next to the flow port, said first portion has an inclination extending radially towards said second portion, said second portion is a horizontal straight portion parallel to the valve member and opposite to the stabilizing chamber, said second portion has a diameter equal to a valve head diameter, said valve seat has an angularly divergent configuration extending from said flow port to an interior of said receiving chamber, said flow port has a smaller diameter than a corresponding diameter of said stabilizing chamber, wherein a diameter of said receiving chamber is larger than the diameter of the second portion.

* * * * *